United States Patent [19]

Ingman

[11] Patent Number: 5,069,067
[45] Date of Patent: Dec. 3, 1991

[54] FLUID FLOW METER
[75] Inventor: Dov Ingman, Haifa, Israel
[73] Assignee: Select Corporation, Los Angeles, Calif.
[21] Appl. No.: 515,069
[22] Filed: Apr. 26, 1990

Related U.S. Application Data
[63] Continuation-in-part of Ser. No. 212,955, Jun. 29, 1988.

[30] Foreign Application Priority Data
Jun. 10, 1988 [IL] Israel ........................................ 86705

[51] Int. Cl.⁵ ............................ G01F 1/54; G01F 3/00
[52] U.S. Cl. ..................................... 73/269; 73/861.21
[58] Field of Search ................ 73/861.18, 861.21, 269, 73/279

[56] References Cited
U.S. PATENT DOCUMENTS

| | | |
|---|---|---|
| 398,013 | 2/1889 | Welker . |
| 3,175,399 | 3/1965 | Medlar . |
| 3,792,204 | 2/1974 | Murayama et al. . |
| 3,824,855 | 7/1974 | Heckle . |
| 3,888,120 | 6/1975 | Burgess . |
| 3,948,098 | 4/1976 | Richardson et al. . |
| 4,141,246 | 2/1979 | Randolph . |
| 4,358,954 | 11/1982 | de Jong . |
| 4,409,830 | 10/1983 | de Jong . |
| 4,578,613 | 3/1986 | Posthuma de Boer . |
| 4,594,890 | 6/1986 | Baker . |
| 4,920,794 | 5/1990 | Ingman ................................ 73/269 |

FOREIGN PATENT DOCUMENTS

| | | |
|---|---|---|
| 59-5917 | 1/1984 | Japan . |
| 0901823 | 1/1982 | U.S.S.R. ............................ 73/269 |

Primary Examiner—Herbert Goldstein
Attorney, Agent, or Firm—Fulwider Patton Lee & Utecht

[57] ABSTRACT

The fluid flow meter includes a flexible membrane formed of a flexible material and containing an apparatus for providing the membrane with resilience for undulation. The membrane is mounted in the fluid flow path such that the pair of faces simultaneously define with the housing fluid impermeable seals at least two different locations along the flow path. The membrane flexes so as to permit passage of discrete quanta of fluid, each having a known volume. The flow meter generates electrical signals corresponding to flexure of the membrane, and the electrical signals are monitored for determining a fluid flow rate.

24 Claims, 9 Drawing Sheets

FLUID FLOW METER

BACKGROUND OF THE INVENTION

Related Applications

This is a continuation-in-part of Ser. No. 7/212,955 filed June 29, 1988.

FIELD OF THE INVENTION

The present invention relates generally to devices for measuring volumetric fluid flow and more specifically to a flow meter having a flexible membrane which operates to permit passage of fluid in travelling waves.

DESCRIPTION OF RELATED ART

Travelling wave fluid meters generally operate by measurement of the rate of undulation of a member which vibrates or undulates as fluid flows past the member. One early form of fluid meter included an undulating metallic spring confined in a fluid flow chamber and a mechanical counter for indicating the amount of fluid flowing therethrough. A more recent type of travelling wave flow meter utilizes an undulating membrane formed of piezoelectric material which generates electrical signals as a function of the rate of undulation.

Such flow meters are generally limited in use to measurement of noncompressible fluids, such as liquids. A metallic spring can offer excessive resistance to the flow of a gas, and a light membrane subject to turbulence at high flow rates and deformation at elevated temperatures can introduce errors in the signal processing necessary for flow measurement with such a device.

Hence, it has been found that for a travelling wave type of flow meter, it would be desirable for a membrane providing for the travelling waves of fluid flow to be as light as possible while effectively blocking the free flow of fluid past the membrane, and to have permanent undulation characteristics. It has been found that metal foils are subject to corrosion, and that plastic membranes tend to acquire a permanent deformation, especially upon exposure to high temperatures, interfering with undulation of the membrane. It would also be desirable to provide a travelling wave membrane which would be largely unaffected by the influence of gravity due to positioning of the flow meter, and which would also have dimensional stability against twisting of the membrane, to prevent free flow past the edges of the membrane. The present invention fulfills these needs.

SUMMARY OF THE INVENTION

Briefly and in general terms, the invention provides for a fluid flow meter having a flexible membrane formed of a flexible material and containing an apparatus providing the membrane with resilience for undulation in one axis perpendicular to the direction of flow and resisting flexing in other directions. The membrane is mounted in a fluid flow path of the meter such that the faces of the membrane simultaneously define with the housing fluid impermeable seals at two or more different locations along the flow path. The membrane is operative to flex so as to permit passage of discrete quanta of fluid, each having a known volume varying as a function of flow rate. Means are provided for generating electrical signals corresponding to flexure of the membrane. Means are also provided for receiving the electrical signals over a measured period of time, determining the rate of the electrical signals, determining the volume of the fluid quanta based upon the electrical signals, and thereby determining a fluid flow rat along the flow path.

According to another aspect of the invention, the apparatus for generating electrical signals comprises first and second piezoelectric members disposed, respectively, on first and second stop members on opposite sides of the membrane and in electrical communication with the monitoring apparatus and such that undulation of the membrane causes the membrane to alternatingly contact the stop members to generate an electrical signal upon release of each quantum of fluid.

In accordance with another aspect of the invention, the monitoring apparatus includes means for identifying electrical signals generated by flexure of the membrane upon release of a single quantum of fluid, and also preferably comprises means for alternatingly receiving the electrical signals from the first and second piezoelectric members to filter out signals not due to true undulation of the membrane.

These and other aspects of the invention will become apparent from the following detailed description, taken in conjunction with the accompanying drawings, which illustrate, by way of example, the principles of the invention.

DETAILED DESCRIPTION OF THE PREFERRED EMBODIMENT

Figure 1:
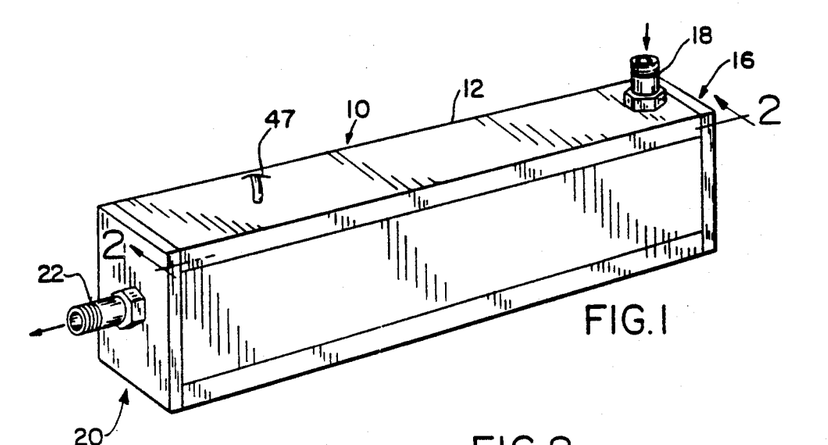
FIG. 1 is a perspective illustration of a quantum fluid flow meter, constructed according to an embodiment of the invention.
Figure 2:
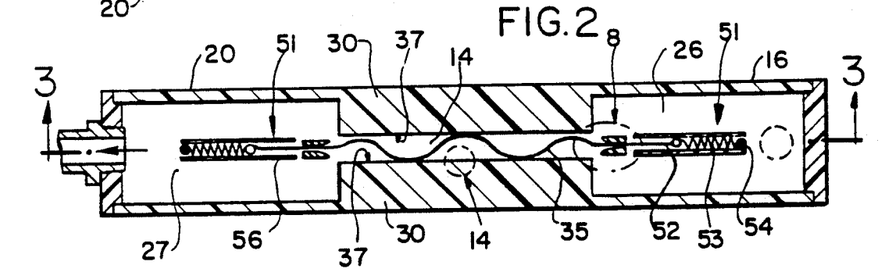
FIG. 2 is a sectional view of the flow meter of FIG. 1, taken along line 2—2 therein.
Figure 3:
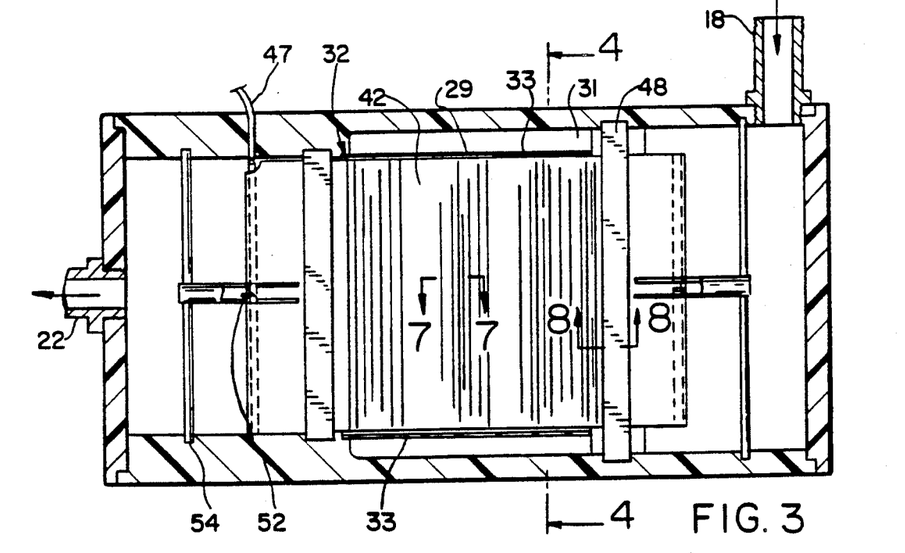
FIG. 3 is a cross-section taken along line 3—3 in FIG. 2.

Referring to FIGS. 1, 2 and 3, a positive displacement fluid flow meter 10, includes a housing 12 defining a fluid flow chamber 14 (FIG. 2) having first and second ends 16 and 20, and having respective first and second fluid ports 18 and 22.

Although in the shown embodiment, fluid ports 18 and 22 function respectively as an inlet and outlet, it will be appreciated from the ensuing description that the internal arrangement of flow meter 10 is such that fluid flow may take place in any chosen direction and with the flow meter at any preferred orientation.

According to a preferred embodiment of the invention, flow meter 10 is used for metering the flow of compressible fluids, such as gas. As, however, as the flow meter of the present invention may also be used for the metering of noncompressible fluids such as oil or water, the flow of "fluid" is described herein throughout except where not applicable.

According to the shown embodiment, housing 12 includes a first end receiving chamber 26 for receiving fluid flow from inlet 18 prior to the fluid passing through flow chamber 14. Chamber 26 permits any debris and, in the case of gas flow, moisture, to be deposited therein prior to flow through flow chamber 14. There is also provided a second end chamber 27, similar to first end chamber 26, for receiving therein any deposition of debris and moisture in a case of flow in a direction opposite to that indicated.

According to the present invention, discrete quanta of fluid, each having a known volume, are permitted to pass across a membrane 35 and volumetric flow may be determined according to the number of such quanta passing across the membrane. This is described in greater detail below. Although membrane 35 is positioned such that in a non-flow situation edges 33 thereof are very close to sidewalls 29, typically in the order of magnitude of several scores of microns, such that leakage of any fluid therepast is prevented, it is preferable in a flow situation, that the gap between the membrane edges and the sidewalls be reduced.

Figure 4:
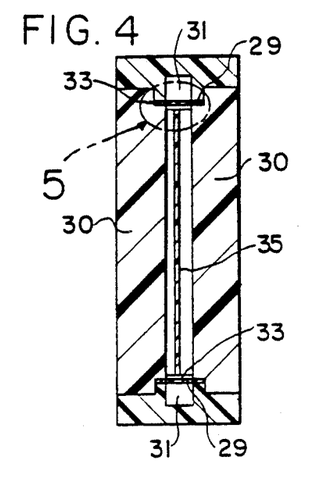
FIG. 4 is a cross-section taken along line 4—4 in FIG. 3.
Figure 5:
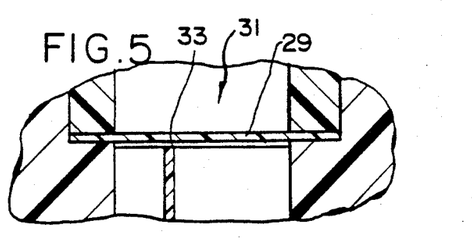
FIG. 5 shows an enlarged detail of a portion of the cross-section shown in FIG. 4.

With reference additionally to FIGS. 4 and 5, flow chamber 14 is, therefore, provided with a pair of preferably rigid first sidewalls 30 and a pair of non-rigid second sidewalls 29 fabricated of a flexible elastomer, such as rubber. As fluid passes across membrane 35, pressure inside flow chamber 14 drops and the flexible, second sidewalls 29 tend, therefore, to move slightly inwards so as to reduce the gap between edges 33 of the membrane and sidewalls 29 to a fluid boundary layer thickness. Due to the high resistance to flow along the gap, leakage is, therefore, substantially prevented. The inward movement of sidewalls 29 is further facilitated by spaces 31 provided adjacent to edges 33 of membrane 35.

Figure 6:
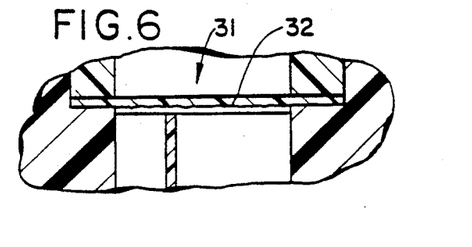
FIG. 6 shows an enlarged detail of a portion of the cross-section shown in FIG. 4, constructed according to an alternative embodiment of the invention.

Referring briefly to FIG. 6, it has been found that when second sidewalls are not made from a flexible material, fluid leakage may be substantially prevented by providing them with a roughened surface 32 (also shown in FIG. 3).

Figure 14:
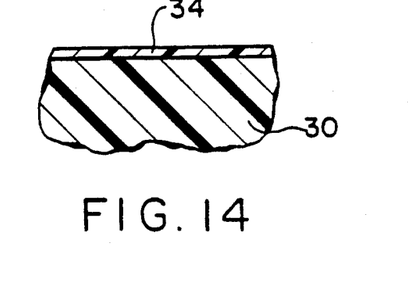
FIG. 14 is a cutaway illustration of a portion of a side wall of the housing of the flow meter shown in FIG. 1.

With particular reference to FIGS. 2 and 14, sidewalls 30 are preferably coated with a thin layer 34 of an antistatic and hydrophobic material such as carbonated polyethylene. Layer 34 prevents the build-up of static electricity in the flow chamber and condensation of moisture on the sidewalls which might otherwise interfere with the flexing of membrane 35. As will be appreciated from the description below, the unimpeded flexing action of membrane 35 is important to maintain. According to an alternative embodiment of the invention, the sidewalls may be made entirely from an antistatic and hydrophobic material.

Figure 7:
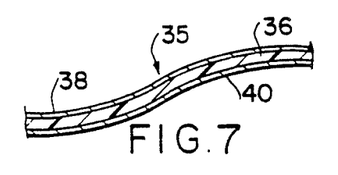
FIG. 7 is a sectional illustration of a portion of a piezoelectric member useful in the flow meter of FIG. 1.

With particular reference to FIG. 7, there is shown a cross-section of a portion of membrane 35. According to the shown embodiment, membrane 35 is piezoelectric and comprises a thin layer 36 of piezoelectric material, such as polyvinylidene fluoride and metallized surrounding layers, referenced 38 and 42.

Figure 17:
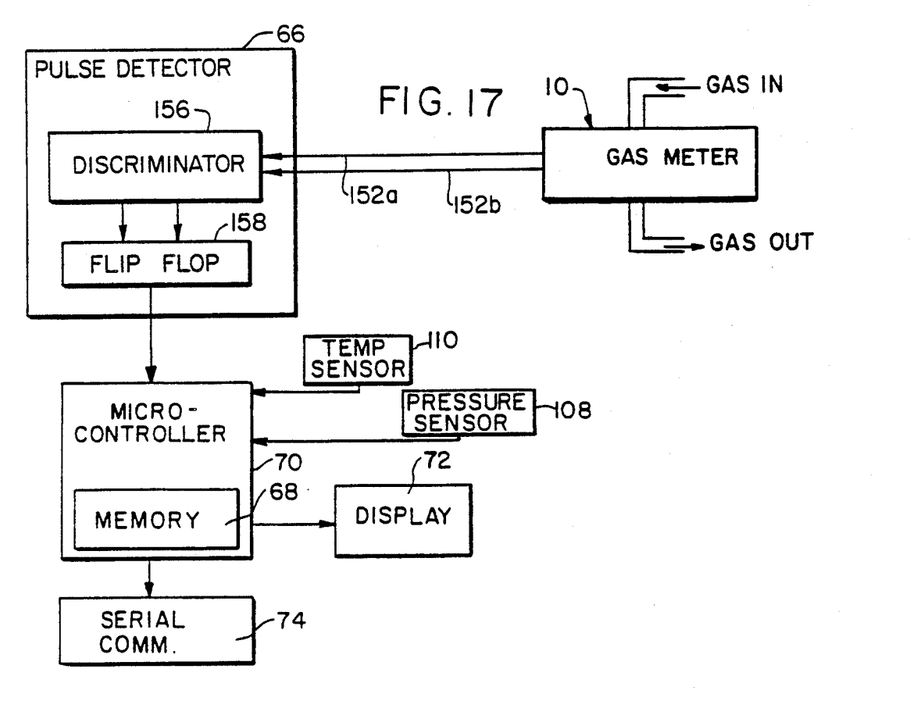
FIG. 17 is a block diagram illustration of electronic apparatus associated with a fluid flow meter of the present invention.
Figure 24:
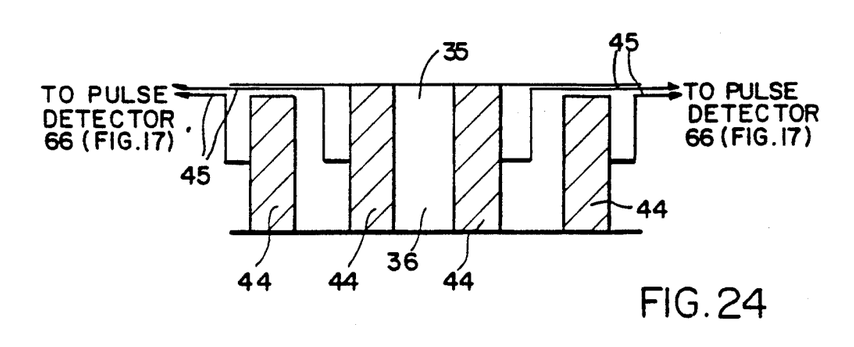
FIG. 24 is a top view of a piezoelectric member, constructed and operative in accordance with an alternative embodiment of the invention.

According to the embodiment shown in FIG. 24, membrane 35 is piezoelectric but, as distinct from the embodiment shown in FIG. 7, the layer 36 of piezoelectric material is overlaid, on either or both faces thereof, by discrete metallized strips 44, each having electrical connections 45 to a pulse detector unit 66 (FIG. 17). As the membrane flexes, as shown and described below in conjunction with FIGS. 15A to 15C, it is thus possible to determine the speed of wave propagation along the flow chamber which can be used by microcontroller 70 (FIG. 17) to further "correct" the calculated volume of each quanta of fluid.

According to a preferred embodiment of the invention, membrane 35 has a substantially vertical position within flow chamber 14. This avoids possible unsymmetrical functioning of the membrane due to the effects of gravity.

As shown in FIG. 2, membrane 35 is preferably longer than the length of flow chamber 14 in which it is positioned. This ensures that membrane 35 takes up a wavelike position and that flat sides 42 of the membrane are in constant engagement with sidewalls 30 of the flow chamber, preferably, at at least three locations.

Figure 13:
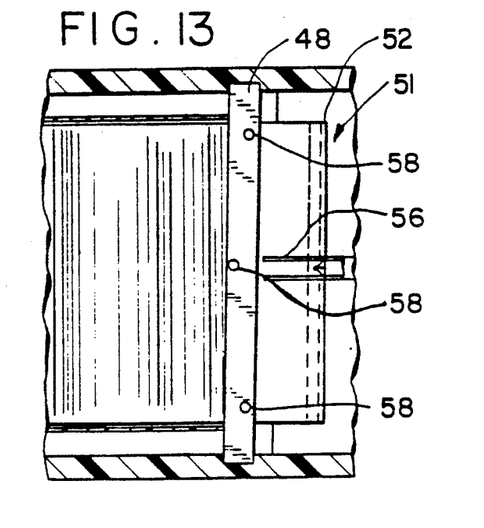
FIG. 13 is an elevational view of an end portion of the piezoelectric member shown in FIG. 3 and showing mounting details thereof.

Referring now to FIGS. 2 and 13, it is seen that membrane 35 is, according to a preferred embodiment, secured at ends 51 thereof about rods 52. Each rod 52 is in turn secured to a fixed rod 54 by means of a spring 53 contained within a housing 56. This type of mounting, it will be appreciated, permits limited longitudinal movement of the membrane within flow chamber 14.

Figure 8:
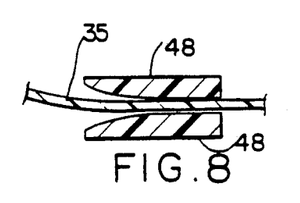
FIG. 8 is an enlarged cross-sectional view taken along line 8—8 in FIG. 3.

Referring now to FIGS. 2 and 8, rounded guide blocks 48 are provided so as to induce instability of membrane 35, it being noted that as each quantum of fluid passes thereacross, a very rapid change of position by flexure of membrane 35 is required. Provision of the guide blocks assists in switching of the membrane from one position to another under a very low input of kinetic energy, such as occurs in gas flows. The range of positions taken up by membrane 35 upon flexure are described below in detail with reference to FIGS. 15A to 15C.

Figure 9:
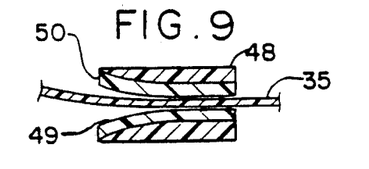
FIG. 9 is a view similar to that of FIG. 8, but showing a construction according to an alternative embodiment of the invention.

Referring briefly to FIG. 9, there is shown an alternative embodiment of guide blocks 48 in which each of the guide blocks also has an additional layer of rubber.

Figure 10:
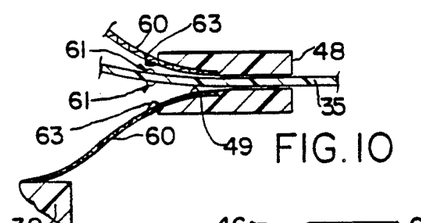
FIG. 10 is a view similar to that of FIG. 8, but showing a construction according to a further embodiment of the invention.
Figure 15A:
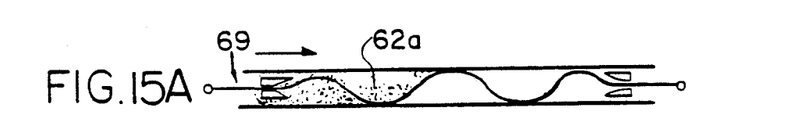
FIG. 15A, 15B and 15C show three successive stages in the transport of discrete fluid quanta across the flow meter of FIG. 1.
Figure 15B:
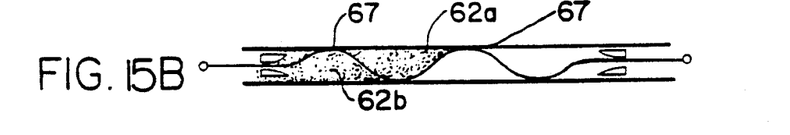
Figure 15C:
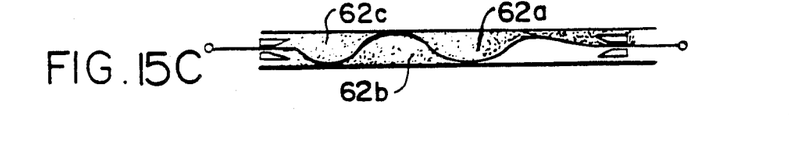

With reference to FIG. 10, there are provided fluid permeable guide extensions 60 that are attached to guide blocks 48 and constitute extensions of curved surfaces 49 thereof. Referring additionally to FIGS. 15A to 15C, it is seen that although membrane 35 generally does not move along the length of the flow chamber, as the discrete quanta of fluid pass through the flow meter, causing the membrane to undulate, points of contact between the membrane and the flow chamber walls "travel" in the direction of fluid flow, the membrane moving by flexure from a first position just prior to release of a quantum of fluid, to a second position just after release of the quantum.

Guide extensions are made, for example, from wire mesh. While not interfering, therefore, with the fluid flow, they have configurations similar to the membrane in either of its two respective positions taken up just before and after release of a quantum of fluid. As the points of contact between the membrane and the chamber walls, which are coincident with the maximum points of curvature of the membrane, move along the flow chamber towards an end thereof, they leave side walls 30 and mount guide extensions 60. Extensions 60 induce a degree of instability that causes, under a relatively low kinetic energy input, a relatively fast change of position of the membrane between the positions taken up thereby just before and after release of a quantum of fluid.

Although, as stated, membrane 35 generally does not move along flow chamber 14, a certain amount of relative motion does occur between the membrane and sidewalls 30 of the flow chamber. It is, therefore, important that inward-facing surfaces 37 of sidewalls 30 are very smooth.

According to one embodiment of the invention, as stated, membrane 35 is made from piezoelectric material. According to an alternative embodiment, however, as shown in FIG. 10, membrane 35 is not made from a piezoelectric material but instead has mounted on it a pair of electrical contacts 61, each which is alternately brought into contact with a corresponding one of a pair of electrical contacts 63 mounted onto guide extensions 60.

It will be appreciated that as each quantum of fluid passes through flow chamber 14 and as membrane 35 switches from one position to the other, an electrical pulse is generated by contact of one of contacts 61 with a corresponding contact 63.

This embodiment has a particular advantage over a piezoelectric membrane as a discrete pulse is generated each time membrane 35 moves so as to release a quantum of fluid. When a piezoelectric membrane is used, however, every movement thereof generates electrical signals, a change in position of the membrane being indicated simply by an increase in intensity of the signals.

According to an alternative embodiment of the invention only a single one of each of electrical contacts 61 and 63 is provided, a single pulse thus being generated as every alternate quantum of fluid is passed. It will also be appreciated that contacts 61 and 63 may be incorporated into other embodiments of the invention, such as those illustrated in FIGS. 8 and 9. In yet a further alternative embodiment of the invention, electrical contacts 63 may be provided independently of guide blocks 48.

Figure 22:
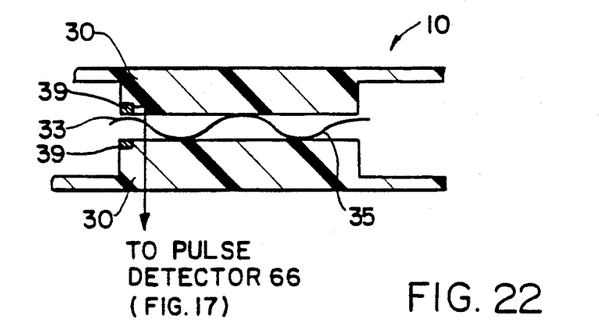
FIG. 22 shows a partial side-section of a fluid flow meter, constructed and operative with an alternative embodiment of the invention.

Referring now to FIG. 22, there is shown an alternative embodiment of the invention in which membrane 35 comprises a magnetic tape. Incorporated into sidewalls 30 are, preferably, a pair of magnetic heads 39. As the points of contact between the membrane and sidewalls 30 travel along the flow chamber, typically just as a quantum of fluid is released, a point of contact of membrane 35 with one of the sidewalls moves across an adjacent head 39, thereby generating an electrical pulse. According to the shown embodiment a signal is generated as every quantum of fluid is released while, according to an alternative embodiment, a single magnetic head may be provided so as to indicate release of alternate quanta of fluid.

Figure 23:
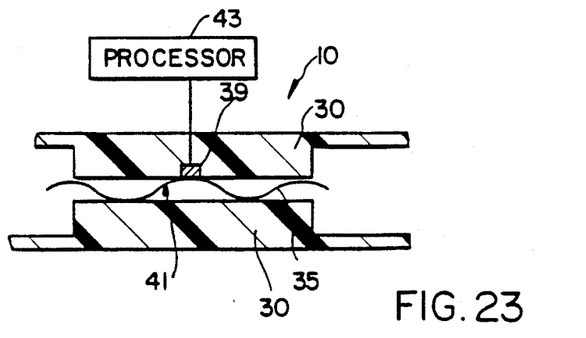
FIG. 23 shows a partial side-section of a fluid flow meter, constructed and operative with a further alternative embodiment of the invention.

Referring now to FIG. 23, in the shown embodiment, as with the embodiment of FIG. 22, membrane 35 comprises a magnetic tape. According to the shown embodiment, however, magnetic head 39 is embedded into second sidewall 30 of the flow chamber, and is operative to engage a face 41 of membrane 35 as it passes in contact therewith.

According to the shown embodiment, the membrane includes a plurality of magnetic bands provided thereon at a known frequency, such as 5 KHz. As face 41 passes in contact with head 39, processing apparatus 43 associated therewith is operative to sense not only passage of a portion of the membrane across the head, but it is also operative to sense the frequency at which the magnetic bands pass, and thus to determine the speed at which the fluid is passing.

Figure 11:
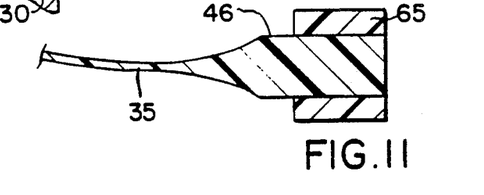
FIG. 11 shows a piezoelectric member similar to that shown in FIG. 7 but wherein the ends thereof are thickened.

Referring to FIG. 11, membrane 35 is shown with thickened ends 46 which may also include additional layers 65 of piezoelectric material. The thickened end and the additional layers of material serve to reduce the possibility of failure of the membrane due to fatigue stresses. According to an alternative embodiment, membranse 35 may have different cross-sectional thickness along the entire length thereof or along selected portions thereof.

Figure 12:
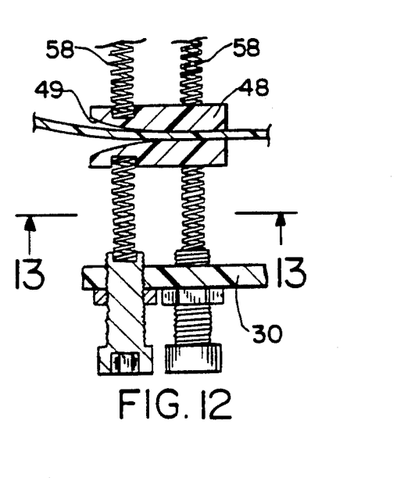
FIG. 12 is a cross-sectional partial view of spring mounts for guide blocks shown in FIG. 8 to 10.

As shown in FIGS. 12 and 13, guide blocks 48 are not rigidly positioned but are preferably secured by springs 58 to sidewalls 30 of the flow chamber.

Reference is now made to FIGS. 15A to 15C, in which there are shown successive stages of fluid flow through the flow meter of the invention. Initially, a first quantum of fluid passes into the flow chamber and exerts a force on the membrane until it is forced to change position. At this stage, the first quantum, referenced 62a, becomes entrapped between the wall of the flow chamber, the membrane and two points of contact, referenced 67, between the membrane and the flow chamber wall.

As the point of contact nearest an inlet 69 is being established, a second quantum of fluid, referenced 62b, enters the chamber and also exerts a force on the membrane, travelling downstream until eventually it too becomes entrapped.

A third quantum of fluid, referenced 62c, enters the flow chamber and also exerts a force on the membrane. The points of contact continue to travel downstream until the membrane moves by flexure from one position to another, thereby releasing the first quantum of fluid and generating an electrical pulse.

It has been found that when the membrane is in touching engagement with the flow chamber walls at at least three locations, possible distortion of the membrane and consequent blockage of the flow chamber, such as might otherwise result from a high rate of flow, is prevented.

Figure 16:
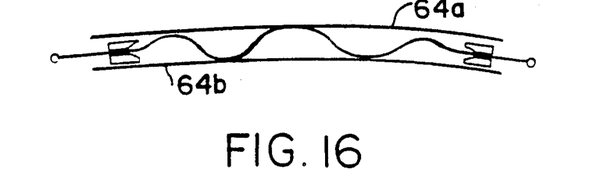
FIG. 16 is a schematic illustration of a fluid flow meter similar to that shown in FIG. 1, but having arched walls.

Referring to FIG. 16, there is shown a flow chamber constructed in accordance with an alternative embodiment of the invention. The flow chamber, referenced 55, comprises a pair of curved walls 64a and 64b. The curvature of chamber 55 results in instability in the positions taken up by the membrane, which, as described above, is desirable. Although quanta of fluid flowing alongside the outer wall 64a will be larger than those flowing alongside inner wall 64b, the quantity of flow can be determined by taking an average of the two different-sized quanta.

Referring now to FIGS. 3 and 17, there is shown an electrical connection 47 to a metallized layer of piezoelectric membrane 35 for carrying to a pulse detector unit 66 (FIG. 17) electrical signals generated by movement of the membrane. According to an embodiment of the invention wherein membrane 35 is not piezoelectric but electrical contacts are used instead, electrical connection 47 is connected to the electrical contacts.

When a piezoelectric membrane is used, the pulse detector unit preferably includes signal processing electronic circuitry that is operative to recognize a particular shape of a pulse or an electrical signal corresponding to flexure of the membrane at the time of release of a quantum of fluid from outlet 22 of the fluid flow meter. It will be appreciated that it is important to be able to distinguish such pulses from background signals that are constantly being generated by the membrane.

A value for the volume of each quantum of fluid is either preset or predetermined and stored in a memory 68 of a microprocessor 70, such that each signal received represents the flow of a reference volume of fluid through the flow meter. The microprocessor preferably also has a display 72 and a serial communication port 74.

According to a preferred embodiment of the invention, by using the preset value for each quantum and according to electrical signals received, the microprocessor is operative to calculate the flow rate. By using flow delivery data, as are typically contained in a look-up table, and by comparing the preset quantum value with a quantum value in the table corresponding to the calculated flow rate, the microprocessor is operative to alter the preset quantum value to a different value. By repeating these steps of calculating and comparing, in iterative fashion, the microprocessor is operative to reach a "true" quantum value and, hence, a true flow value.

Also, according to a preferred embodiment of the invention, pressure and temperature sensors, respectively referenced 108 and 110 (FIG. 17), are mounted in the flow chamber and are effective to continuously provide to the microprocessor pressure and temperature readings. The microprocessor also calculates any necessary adjustment of the preset value for the volume of each quantity of fluid, according to the pressure and temperature data received.

The pressure and temperature readings may also be used by microcontroller 70 to provide an alarm indication when the temperature rises to a dangerously high level, which may indicate fire or where the pressure drops below a predetermined threshold value, which may serve as an indication of leakage in the system.

According to an alternative embodiment of the invention, multiple flow meters may be provided to accommodate a very large fluid flow, with the flow pulse signals being directed to a central microcontroller for determination of the overall fluid flow rate.

Figure 18:
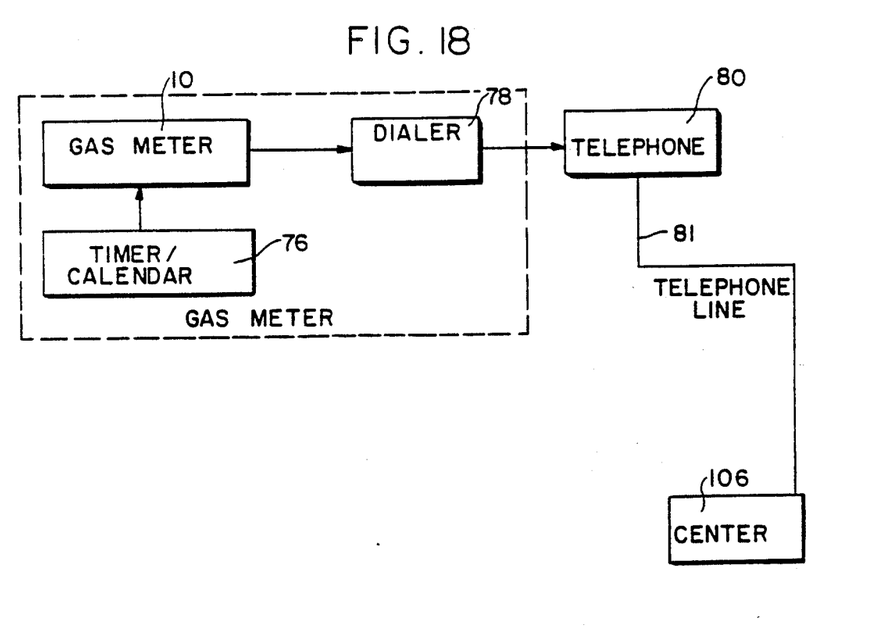
FIG. 18 is a block diagram illustration showing a telemetering system, useful in conjunction with a fluid flow meter of the present invention.

Reference is now made to FIG. 18, wherein there is shown, in block diagram form, centralized data collection apparatus utilizing the flow meter of the present invention. In accordance with a preferred embodiment of the invention, a dialer 78, which permits communication between the flow meter and a domestic telephone line 81, is operative to automatically dial a data center 106 and to send thereto information pertaining to fluid flow as measured by the meter.

A timer 76 may also be provided to trigger dialer 78 at a given interval, such as once a month and preferably at a time when the telephone line is unlikely to be in use. The dialer is also preferably operative to continue dialing from the time it is triggered by timer 76, until it manages to get through to data center 106 and pass the required information. In the event that the connection is broken while the information is being passed, dialer 78 is operative to redial, if necessary repeatedly, until the information is successfully passed.

Figure 19:
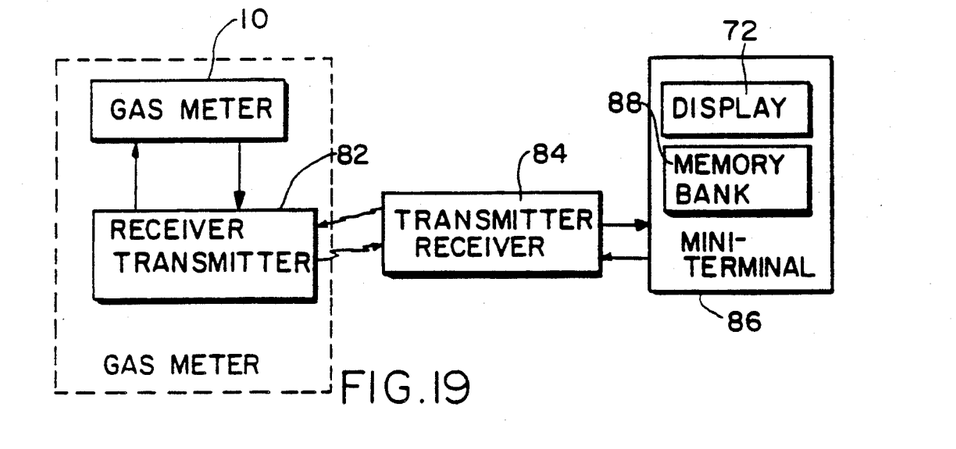
FIG. 19 is a block diagram illustration showing an alternative telemetering system, useful in conjunction with a fluid flow meter of the present invention.
Figure 20:
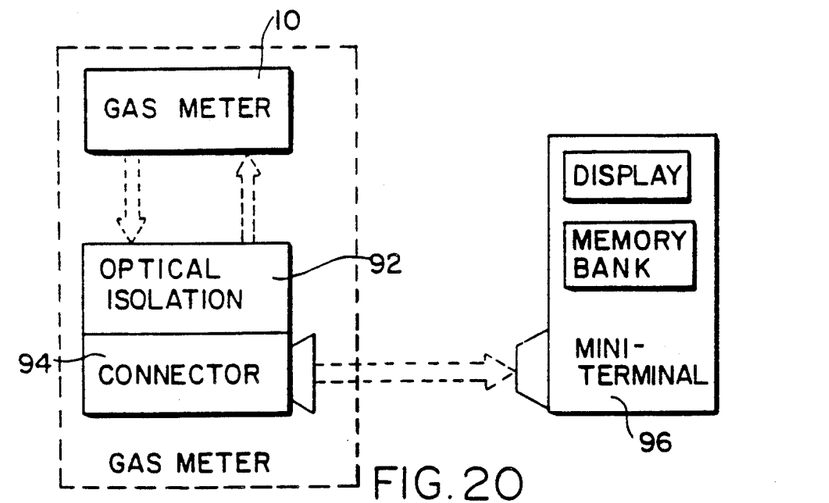
FIG. 20 diagram illustration showing a further alternative telemetering system, useful in conjunction with a fluid flow meter of the present invention.

Referring now to FIG. 19, communication between the flow meter and a mini-terminal 86 may be provided by means of a first receiver-transmitter 82 linked to the flow meter and a second receiver-transmitter 84 associated with the mini-terminal. The mini-terminal may also be equipped with a memory bank 88 and a display panel 90. Local networks of an optically-isolated unit 92 may be provided through a connector 94 to a mini-terminal 96, as shown in FIG. 20.

Figure 21:
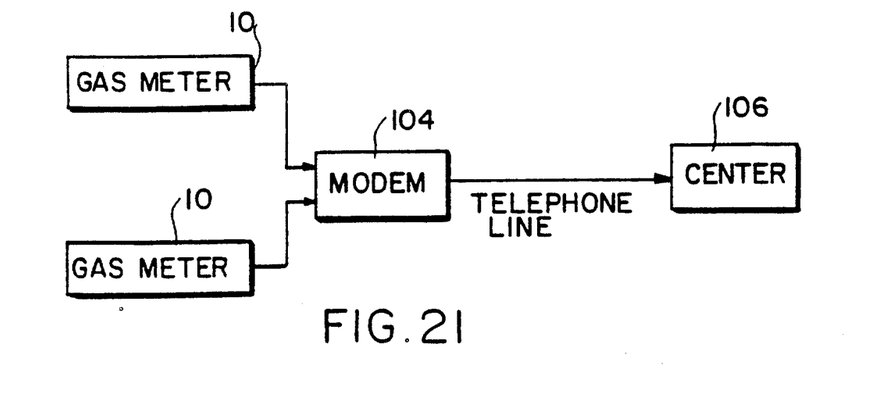
FIG. 21 shows a multiplexed telemetering system, useful in conjunction with a fluid flow meter of the present invention.

Referring to FIG. 21, fluid meters 10, which, according to a preferred embodiment are gas flow meters, may be connected with a remote data center 106 by means of a modem 104. This permits not only regular sending of flow information from the gas meters to the data center, but it also permits data center initiated scanning of the gas meters.

Figure 25:
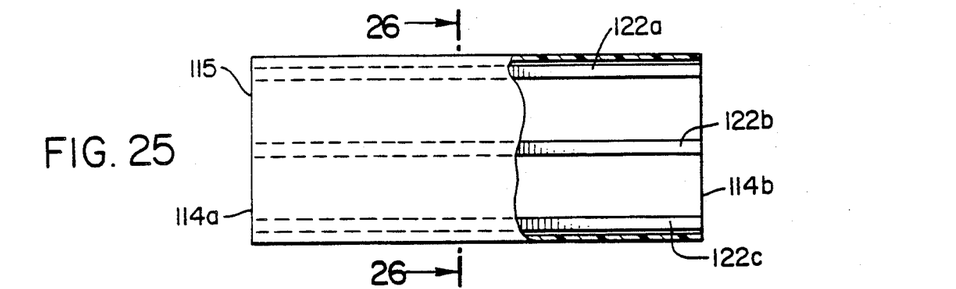
FIG. 25 is a top view of an alternate embodiment of a flexible membrane.
Figure 26:
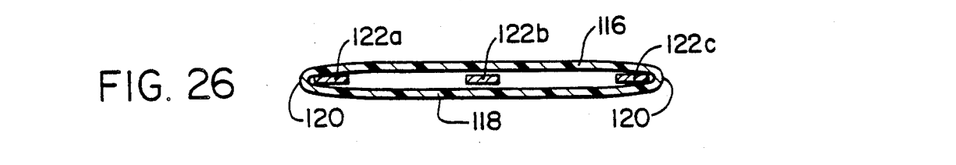
FIG. 26 is a cross-sectional view of the embodiment of FIG. 25 taken along line 26—26.

As illustrated in FIGS. 25 and 26, another embodiment of the membrane is a membrane 115 formed of an upper layer 116 and a lower layer 118 bonded together along their lateral, longitudinal edges 120, typically either by heat sealing or by adhesive. Since it is desirable for the membrane to be as light as possible in order to be able to perform in any position with the least effect from gravity, the flexible layers of membrane may be typically formed to each have a thickness of approximately 5 microns. In this embodiment the membrane material can be composed of a flexible plastic and may for example be formed of polyethylene. Other types of thermoplastic or thermosetting plastics may also be suitable. A wide variety of plastics have been found to behave like a thermoplastic, deforming under high temperatures, thereby interferring with the natural flexing undulation of the material, and even deforming sufficiently to block fluid flow. Although metal foils resist deformation due to exposure to high heat, such metal foils are also subject to corrosion, and tend to crack and fail eventually. It has been found that placement of strips 122 a, b, c of a flexible material which retains undulation characteristics even at high temperatures within the envelope formed by the upper and lower layers of the two-layer membrane allows the membrane to retain its undulation characteristics even at high temperatures, to retain corrosion resistance, and allows the membrane to be formed with extremely thin layers of flexible plastic material. The strips 122 are typically formed of glass fibers such as optical fibers, but may also be formed of graphite fibers, fabric fibers, or can even be formed by thin metal strips.

Figure 27:
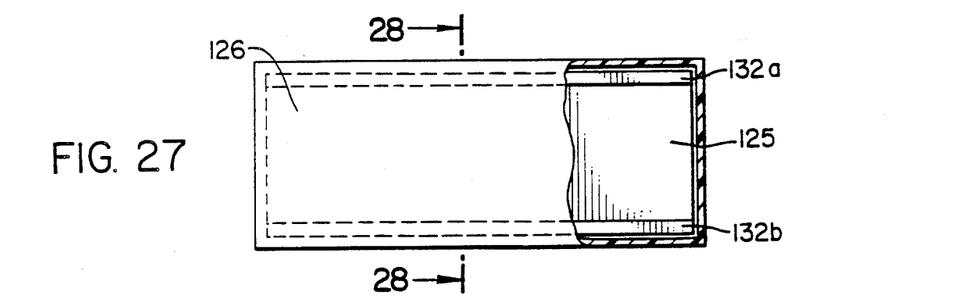
FIG. 27 is a top plan view of a further embodiment of a flexible membrane.
Figure 28:
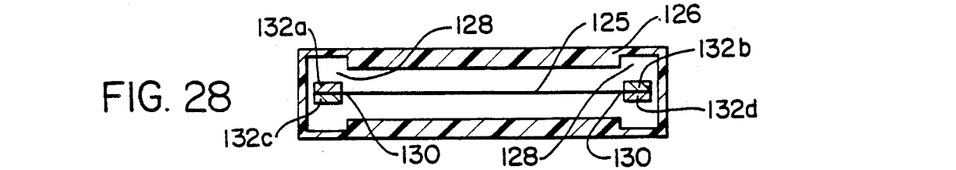
FIG. 28 is a cross-sectional view of the embodiment of FIG. 27 taken along line 28—28.

Referring to FIGS. 27 and 28, another form of the flexible membrane utilizing a single layer of flexible material 125 similar to the material used in the double-layer membrane 115, includes multiple strips 132 a, b, c, d mounted on the outer lengthwise edges of the membrane. Other strips could also be mounted at other locations lengthwise along the membrane, and the housing 126 is formed with corresponding inner channels 128 inset in the housing to form guides for the undulation motion of the strips. The strips are mounted at the edges 130 of the membrane. These strips 132 may similarly be formed of glass fibers, graphite fibers, fabric, metal strips, or the like, and are preferably bonded to the outer surface of the membrane, as by adhesive. In the embodiment on FIGS. 25 and 26, the strips 122 are preferably only bonded to the membrane at the longitudinal ends 114 a, b of the membrane. It should also be recognized that the strips of heat resistant flexing material can be formed either in rectilinear shapes, or in curved shapes, or can be formed to have varying thicknesses along their length, in order to modify and adapt the flexing characteristics of the membranes.

Figure 29:
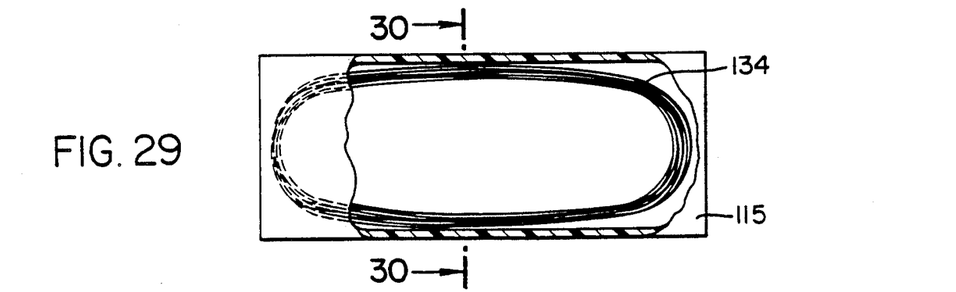
FIG. 29 is a top plan view of a further embodiment of a flexible membrane.
Figure 30:
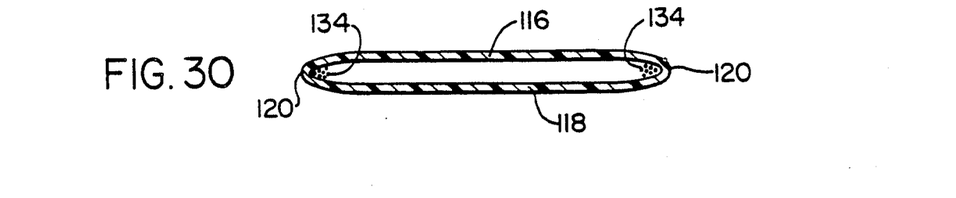
FIG. 30 is a cross-sectional view of the embodiment of FIG. 29 taken along line 30—30.
Figure 31:
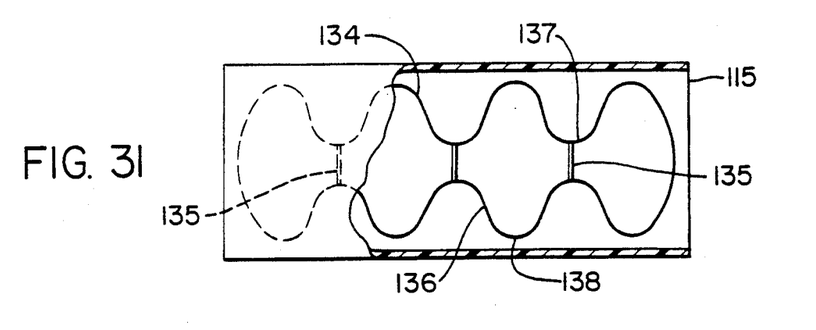
FIG. 31 is a top plan view of a further embodiment of a flexible membrane.

Another form of a two-layer membrane is illustrated in FIGS. 29 and 30, showing an elongated coil of heat resistant fiber material placed within a sealed envelope formed between the two layers of the membrane 115. The coil 134 naturally expands to be located around the inner periphery of the envelope, and in particular extends along the inner longitudinal edges 120 of the membrane. The elongated fiber is preferably a loose coil within the membrane, and is typically formed of glass fibers, such as optical fibers, although graphite and fabric fibers are also suitable.

In order to create a membrane having different elasticity along the length of the membrane, the coil 134 can be tied together at regular intervals along the length of the membrane by fiber connecting ties 135. Thus, it will be appreciated that the portion of the coil 136 between the longitudinally extending portion of the coil 137 at the connecting ties and the longitudinally extending portion of the coil 138 at the inner periphery of the membrane envelope is more resistive to longitudinal flexing of the membrane, which can enhance the regular, flexing, pulsing undulation characteristics of the membrane.

Figure 32:
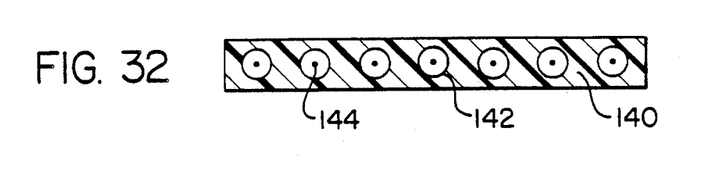
FIG. 32 is a cross-sectional view of a further embodiment of a flexible membrane.

Still yet another form of a membrane with supporting fibers or strips to enable the membrane to retain its undulation characteristics is shown in FIG. 32. The single membrane layer 140 includes multiple inner channels 142, loosely containing elongated fibers 144, similar to the fibers referred to above. These fibers 144 are also preferably only bonded to the longitudinal ends 114 a, b of the membrane, to allow for free flexing of the membrane. Such a single layer membrane as is shown in FIG. 32 is typically approximately 60 microns thick.

It has also been found that flexing of the membrane in response to fluid flow through the flow meter may also produce vibration of the membrane not corresponding to individual quanta of fluid flow, making it difficult for the signal processing circuitry to distinguish between signal pulses representing quanta of fluid flow and vibrations, particularly at high fluid flow rates, which can induce turbulent flow in the meter.

One embodiment of the flow meter which is particularly useful in helping to discriminate between signal pulses representing quanta of fluid flow and vibrational pulses is illustrated in FIG. 3. Here, a double layer membrane having the upper layer 116 and the lower layer 118 with the middle layer of flexing supporting material 122 therebetween extends between guideblocks 148, having stopper members 150 mounted to and extending from the inner surfaces 151 of the upper and lower guideblocks. The stopper members thus serve as extension guides, and also limit the flexing motion of the membrane, which strikes the stopper members sequentially as it flexes. The stopper members are typically currently formed of thin leaf springs. Piezoelectric elements 152 a, b are mounted at the longitudinal ends 153, and preferably on the outer surfaces of the leaf spring stopper members. Thus, the alternating flexing of the membrane causes the membrane to strike the stopper members, causing the piezoelectric elements to sequentially generate signal pulses representing the passage of a quantum of fluid flow. The piezoelectric elements are in electrical communication with the pulse detector of the signal processing circuitry, as shown in FIG. 17.

In order to further discriminate the signals due to vibrations of the membrane as it strikes the stopper members, from signal pulses due to passage of quanta of fluid flow, a discriminator circuit 156 is included in the pulse detector, to generally pass signals over a predetermined threshold, which passes the received signals to a flip-flop circuit 158, which operates to pass individual pulse signals in alternating sequence from the first and second piezoelectric elements, to the microcontroller 70.

Figure 33:
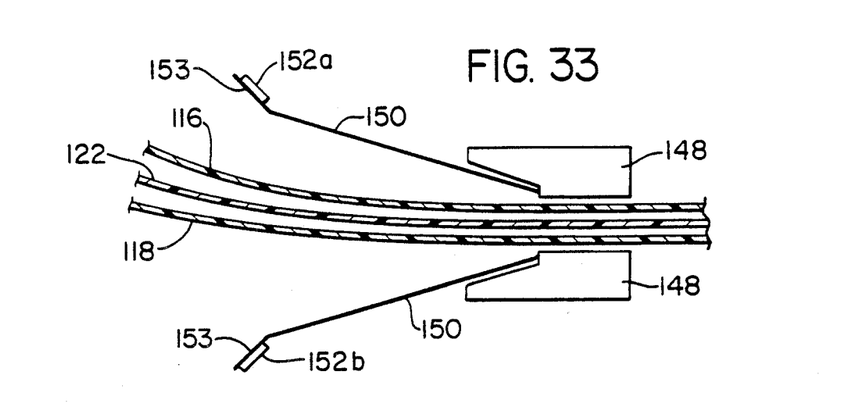
FIG. 33 is a view similar to that of FIG. 8, but showing a construction according to a further alternative embodiment of the invention.
Figure 34:
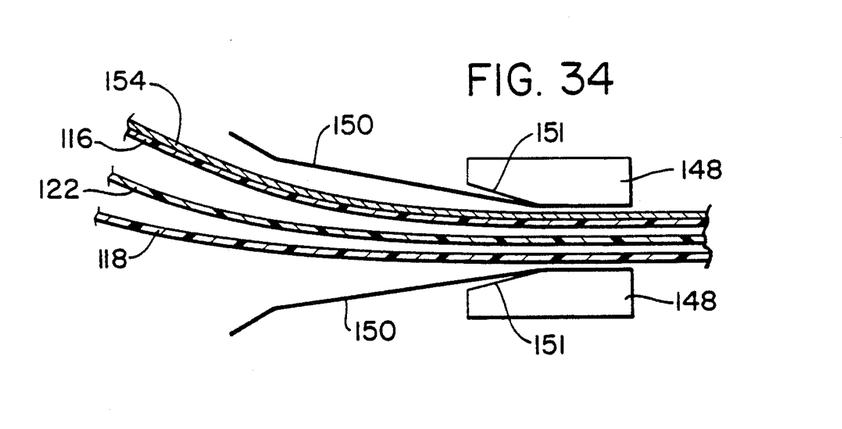
FIG. 34 is a view similar to that of FIG. 8, but showing another further alternative embodiment of the invention.

Another arrangement of a membrane between stopper members to cause a piezoelectric element to generate signal pulses principaly when the membrane strikes the stopper members is shown in FIG. 34. Here, the arrangement is similar to that shown in FIG. 33, except that the piezoelectric element 154 is in the form of a piezoelectric film or layer mounted to the membrane. The piezoelectric film can be mounted on one outside surface of the membrane, as is shown in FIG. 34, or can be contained loosely within the two layers of the membrane envelope, so that as the membrane undulates from a first position striking a first stopper member to a second position striking a second stopper member, the piezoelectric element sequentially generates electrical pulses representing passage of quanta of fluid flow. Thus, in the embodiment shown in FIG. 33, the piezoelectric signals are not a measure of bending per se of the membrane, and only represent striking of the membrane on the stopper members, where as in FIG. 34, the main signal from the piezoelectric material comes from the striking of the membrane against the stopper member, but also is generated by bending and vibration of the membrane. In the case in which the piezoelectric film is bonded to the membrane, the piezoelectric element is preferably bonded with an elastic adhesive, allowing the piezoelectric material to flex with the membrane.

Figure 35:
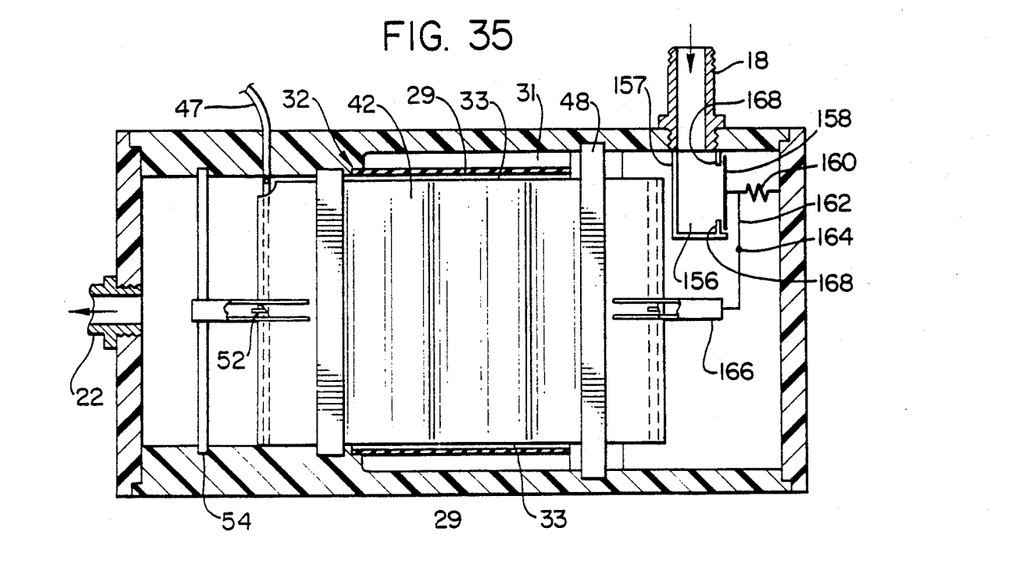
FIG. 35 is a view similar to that of FIG. 3, showing a mechanism for rendering the membrane flat during periods of no-flow.

As mentioned previously, one of the problems associated with operation of the fluid flow meter at elevated temperatures is the creation of permanent curvature of the membrane. This permanent curvature of the membrane can also be caused under conditions of no flow, so that it may also be desirable to maintain the membrane in a fully flattened condition during periods of no flow or minimal flow. A minimum flow condition in a natural gas distribution system may merely involve the quantity of flow consumed by pilot flames, for example. One embodiment of the flow meter which can cause the membrane to become flattened during periods of no flow to help prevent permanent deformation of the membrane is illustrated in FIG. 35. An inner antechamber 156 is provided, which is connected to and in fluid communication with the fluid inlet port 18. The inner antechamber is defined by the antechamber housing 157, generally comprising an angled member, directing the fluid flow toward a diaphragm 158 positioned at the outlet of the inner antechamber, and connected to the main housing wall by a relatively weak compression spring 160. One end of a lever arm 162 is also connected to the spring, with the lever arm pivoting about the pivot point 164 mounted to the housing, and with the other end of the lever arm connected to the upstream end of the membrane spring mounting 166. Under a condition of no flow, the diaphragm is pressed against the diaphragm limit stops 168 on the inner antechamber housing, pivoting the lever arm so that the end of the membrane is pulled sufficiently taut to flatten the membrane. The spring 160 is sufficiently weak that a minimal fluid flow through the inlet port can dislodge the diaphragm from the diaphragm limit stops, to allow the flow meter to function.

Figure 36:
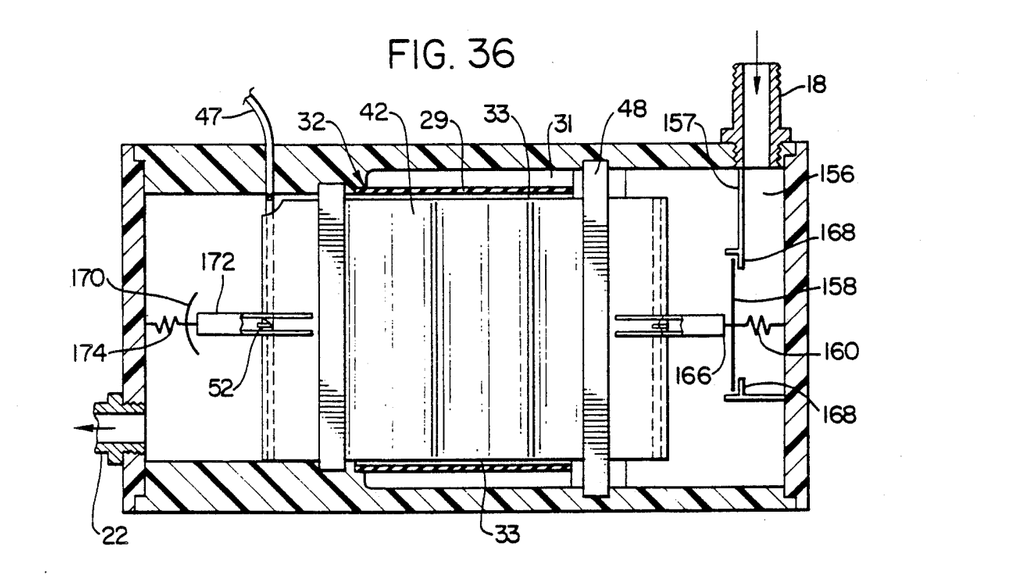
FIG. 36 is a view similar to that of FIG. 35 showing a mechanism for adjusting the tension on the membrane.

Another similar embodiment of a mechanism for maintaining the membrane in a flattened condition during periods of no flow is illustrated in FIG. 36. An inner antechamber 156 is also in fluid communication with the fluid inlet port 18, with the inner antechamber being formed by the antechamber housing 157. A diaphragm 158 is moved in the direction of fluid flow when the quantity of fluid flow exceeds a minimum threshold, and the diaphragm is pressed up against the diaphragm limit stops 168 on the antechamber housing by the tension spring 160, connected between the diaphragm and the flow meter housing. The diaphragm is also connected to the upstream end of the membrane spring mounting. This mechanism operates in a fashion similar to the mechanism of FIG. 35, without pivoting of a lever arm.

In order to adaptively change the distance between the spring mounting clamps at the ends of the membrane to compensate for the tendency of higher flow rate to increase the degree of curvature of the membrane, a mechanism similar to a mechanism for flattening the membrane at the upstream end of the membrane may also be provided at the downstream end of the membrane. In the embodiment illustrated in FIG. 36, a cupped or parabolic drogue member 170 is attached to the clamp at the downstream end of the membrane spring mounting 172, and is further attached to the housing of the flow meter by a tension spring 174. At increasing flow rates, the drogue member will therefore exert an increasing tension on the membrane, to oppose the tendency of the membrane to be increasingly curved at the higher flow rates.

It will be appreciated by persons skilled in the art that the present invention is not limited to what has been shown and described hereinabove. The scope of the invention is, rather, limited solely by the claims, which follow.

I claim:

1. A fluid flow meter, comprising:
   a housing having a pair of fluid ports and defining a fluid flow path therebetween;
   a flexible membrane extending lengthwise in the direction of fluid flow and mounted for flexure at opposing longitudinal ends of the membrane within the housing, said membrane having a pair of opposing faces and two opposite side edges extending generally in the direction of fluid flow mounted in the fluid flow path such that the side edges form seals with said housing, and the pair of faces simultaneously define with the housing fluid impermeable seals at least two different locations along the flow path operative to flex so as to permit passage of discrete quanta of fluid, each quantum of fluid having a known volume varying as a function of flow rate;
   at least one elongated resilient member disposed within said membrane forming a plurality of lines of resilience extending between said longitudinal ends of said membrane in the direction of said fluid flow path for providing the membrane with resilience for undulation of flexing;
   means for generating electrical signals corresponding to flexure of said membrane; and
   monitoring means for receiving the electrical signals from said means for generating electrical signals over a period of time determining the rate of said electric signals, determining the volume of said quanta based upon said electrical signal rate, and thereby determining a fluid flow rate along said flow path.

2. The flow meter of claim 1, wherein said flexible membrane is formed of at least one layer of flexible material.

3. The flow meter of claim 2, wherein said flexible membrane is formed of two layers of flexible material sealingly bonded together about their perimeters.

4. The flow meter of claim 2, wherein said flexible membrane is formed of a tube of flexible material having two opposite end openings sealingly bonded together.

5. The flow meter of claim 2, wherein said flexible membrane is formed of a sheet of flexible material having internal channels extending lengthwise in the direction of said fluid flow path.

6. The flow meter of claim 2, wherein said flexible material is non-resilient.

7. The flow meter of claim 1, wherein said at least one elongated resilient member comprises a plurality of elongated resilient strips are secured to at least one longitudinal end of said membrane extending in the direction of fluid flow.

8. The flow meter of claim 7, wherein said strips are rectilinear in shape.

9. The flow meter of claim 7, wherein said strips vary in thickness in at least one dimension.

10. The flow meter of claim 7, wherein said flexible membrane is formed of two layers of flexible material sealingly bonded together about their perimeters, and wherein said strips are enclosed between said layers of flexible material.

11. The flow meter of claim 10, wherein said strips are bonded over the length of said strips to at least one of said layers of flexible material.

12. The flow meter of claim 1, wherein said at least one resilient member comprises elongated fiber material.

13. The flow meter of claim 12, wherein said membrane is formed of a sheet of flexible material having at least one internal channel extending lengthwise in said membrane, and said fiber material is enclosed in at least one said internal channel.

14. The flow member of claim 1, wherein said at least one resilient member comprises a coil of an elongated fiber material enclosed between two layers of flexible material, and at least a portion of said coil extends from one of said side edges to the other of said side edges.

15. The flow meter of claim 14, wherein opposite sides of said coil are secured together at at least one location.

16. The flow meter of claim 1, wherein said means for generating electrical signals corresponding to flexure of said membrane includes stop means adjacent to at least one of said faces.

17. The flow meter of claim 16, wherein said stop means comprises at least one stopper member mounted on a guide member mounted within said housing adjacent a longitudinal end of said flexible membrane.

18. The flow meter of claim 16, wherein said stop means comprises a pair of stopper members mounted within said housing adjacent said membrane faces, respectively.

19. The flow meter of claim 18, wherein said flexible membrane has first and second longitudinal ends, and further including at least one pair of guide members mounted within said housing adjacent one of said ends of said flexible membrane, and wherein said stopper members each comprise a leaf spring mounted to one of said guide members.

20. The flow meter of claim 16, wherein said means for generating electrical signals further includes piezoelectric material mounted within said housing such that undulation of said membrane causes said membrane to strike said stop means, causing said piezoelectric material to generate an electrical signal.

21. The flow meter of claim 20, wherein said stop means comprises a stopper member mounted in a guide member in said housing adjacent said membrane, and said piezoelectric material is mounted on at least one said stopper member.

22. The flow meter of claim 20, wherein said piezoelectric material is mounted on at least one face of said flexible membrane.

23. The flow meter of claim 1, wherein said membrane moves by flexure from a first position prior to release of a quantum of fluid to a second position after release of the quantum of fluid, and wherein said monitoring means includes pulse detector means for receiving pulse signals from a first piezoelectric element mounted for detection of flexure of said membrane to said first position and for receiving pulse signals from a second piezoelectric element mounted for detection of flexure of said membrane to said second position.

24. The flow meter of claim 23, wherein said monitoring means includes signal processing means, and said pulse detector means includes flip flop means for passing individual pulse signals in alternating sequence from said first and second piezoelectric elements to said signal processing means.

* * * * *